United States Patent
Okuniewicz

(10) Patent No.: US 8,986,105 B2
(45) Date of Patent: Mar. 24, 2015

(54) SUPPLEMENTAL BONUSING SYSTEM FOR AN ELECTRONIC GAMING DEVICE

(76) Inventor: Douglas M. Okuniewicz, Las Vegas, NV (US)

( * ) Notice: Subject to any disclaimer, the term of this patent is extended or adjusted under 35 U.S.C. 154(b) by 1874 days.

(21) Appl. No.: 11/033,610

(22) Filed: Jan. 11, 2005

(65) Prior Publication Data

US 2005/0170877 A1 Aug. 4, 2005

Related U.S. Application Data

(63) Continuation-in-part of application No. 09/639,441, filed on Aug. 15, 2000, now Pat. No. 6,840,860, which is a continuation-in-part of application No. 08/944,075, filed on Dec. 19, 1997, now Pat. No. 6,146,276, which is a continuation-in-part of application No. 08/795,152, filed on Feb. 7, 1997, now Pat. No. 5,908,354.

(51) Int. Cl.
| | |
|---|---|
| G07F 17/32 | (2006.01) |
| G06F 3/16 | (2006.01) |
| A63F 3/08 | (2006.01) |
| A63F 1/00 | (2006.01) |

(52) U.S. Cl.
CPC . *G06F 3/16* (2013.01); *A63F 3/081* (2013.01); *A63F 2001/008* (2013.01); *G07F 17/32* (2013.01); *G07F 17/3202* (2013.01); *G07F 17/3248* (2013.01)
USPC ............... 463/25; 463/26; 463/27; 463/28; 463/40; 463/41; 463/42

(58) Field of Classification Search
USPC ............................. 463/25–28, 40–42
See application file for complete search history.

(56) References Cited

U.S. PATENT DOCUMENTS

| | | |
|---|---|---|
| 3,417,249 A | 12/1968 | Akmenkalns |
| 4,069,488 A | 1/1978 | Fiorenza |
| 4,100,597 A | 7/1978 | Fleming |
| 4,280,221 A | 7/1981 | Chun |
| 4,283,709 A | 8/1981 | Lucero |
| 4,522,399 A | 6/1985 | Nishikawa |
| 4,569,019 A | 2/1986 | DiOrio et al. |
| 4,611,808 A | 9/1986 | Palmer |
| 4,648,063 A | 3/1987 | Strout |
| 4,837,728 A | 6/1989 | Barrie |
| 4,884,972 A | 12/1989 | Gasper |
| 4,964,638 A | 10/1990 | Ishida |
| 4,993,713 A | 2/1991 | Harada |
| 5,096,195 A | 3/1992 | Gimmon |
| 5,149,104 A | 9/1992 | Edelstein |
| 5,178,389 A | 1/1993 | Bentley |
| 5,192,854 A | 3/1993 | Counts |
| 5,265,874 A | 11/1993 | Dickinson |
| 5,280,909 A * | 1/1994 | Tracy .............................. 463/27 |
| 5,290,033 A | 3/1994 | Bittner |
| 5,375,830 A | 12/1994 | Takemoto |
| 5,390,938 A | 2/1995 | Takeya |

(Continued)

*Primary Examiner* — Dmitry Suhol
*Assistant Examiner* — David Duffy
(74) *Attorney, Agent, or Firm* — David E. Mixon; Bradley Arant Boult Cummings LLP

(57) ABSTRACT

A printing and dispensing system for an electronic gaming device has been developed. The system includes a gaming device with a processor that generates an outcome for the gambling device and a bonus system that generates payout that is supplemental to the payout of the gaming device. The supplemental payout is generated is response to gaming events in the gaming device.

33 Claims, 11 Drawing Sheets

(56) References Cited

U.S. PATENT DOCUMENTS

| | | |
|---|---|---|
| 5,393,073 A | 2/1995 | Best |
| 5,397,125 A | 3/1995 | Adams |
| 5,398,932 A | 3/1995 | Eberhardt |
| 5,411,258 A | 5/1995 | Wilson |
| 5,429,361 A | 7/1995 | Raven |
| 5,467,856 A | 11/1995 | Okada |
| 5,470,079 A | 11/1995 | LeStrange |
| 5,472,195 A | 12/1995 | Takemoto |
| 5,472,197 A | 12/1995 | Gwiasda |
| 5,487,544 A | 1/1996 | Clapper, Jr. |
| 5,542,669 A * | 8/1996 | Charron et al. ............ 463/13 |
| 5,579,537 A | 11/1996 | Takahisa |
| 5,586,936 A | 12/1996 | Bennett |
| 5,586,937 A | 12/1996 | Menashe |
| 5,609,337 A | 3/1997 | Clapper, Jr. |
| 5,638,426 A | 6/1997 | Lewis |
| 5,655,961 A | 8/1997 | Acres |
| 5,685,775 A | 11/1997 | Bakoglu |
| 5,709,603 A | 1/1998 | Kaye |
| 5,759,102 A | 6/1998 | Pease |
| 5,766,075 A | 6/1998 | Cook |
| 5,770,533 A | 6/1998 | Franchi |
| 5,781,911 A | 7/1998 | Young |
| 5,813,511 A | 9/1998 | Takemoto |
| 5,816,918 A | 10/1998 | Kelly |
| 5,819,281 A | 10/1998 | Cummins |
| 5,820,459 A | 10/1998 | Acres |
| 5,823,874 A | 10/1998 | Adams |
| 5,830,064 A | 11/1998 | Bradish |
| 5,833,537 A | 11/1998 | Barrie |
| 5,835,126 A | 11/1998 | Lewis |
| 5,836,817 A | 11/1998 | Acres |
| 5,871,398 A | 2/1999 | Schneier |
| 5,876,284 A | 3/1999 | Acres |
| 5,915,588 A | 6/1999 | Stoken |
| 5,917,725 A | 6/1999 | Thacher |
| 5,970,143 A | 10/1999 | Schneier |
| 6,007,426 A | 12/1999 | Kelly |
| 6,015,344 A | 1/2000 | Kelly |
| 6,048,269 A | 4/2000 | Burns |
| 6,244,958 B1 | 6/2001 | Acres |
| 6,319,125 B1 | 11/2001 | Acres |
| 6,729,958 B2 | 5/2004 | Burns |
| 6,827,646 B2 | 12/2004 | Adams |
| 2004/0038723 A1 | 2/2004 | Schneier |
| 2004/0106449 A1 | 6/2004 | Walker |
| 2004/0248634 A1 | 12/2004 | Herrmann |
| 2005/0250567 A1 | 11/2005 | Kane |
| 2005/0250568 A1 | 11/2005 | Kane |
| 2005/0250569 A1 | 11/2005 | Kane |
| 2005/0250571 A1 | 11/2005 | Kane |
| 2005/0250572 A1 | 11/2005 | Kane |
| 2005/0250573 A1 | 11/2005 | Kane |
| 2005/0250574 A1 | 11/2005 | Kane |
| 2005/0250575 A1 | 11/2005 | Kane |
| 2005/0250576 A1 | 11/2005 | Kane |

* cited by examiner

SUPPLEMENTAL BONUSING SYSTEM FOR AN ELECTRONIC GAMING DEVICE

CROSS-REFERENCE TO RELATED APPLICATIONS

This application is a continuation-in-part of U.S. application Ser. No. 09/639,441 entitled "Printing and Dispensing Bonusing System for Gaming Devices" filed on Aug. 15, 2000, now U.S. Pat. No. 6,840,860 which is a continuation-in-part of U.S. application Ser. No. 08/944,075 filed on Dec. 19, 1997, now U.S. Pat. No. 6,146,276, which is a continuation-in-part of U.S. application Ser. No. 08/795,152 now U.S. Pat. No. 5,908,354, filed Feb. 7, 1997.

BACKGROUND OF INVENTION

1. Field of the Invention

The invention relates generally to electronic gaming devices. More specifically, the invention relates to a printing and dispensing system for electronic gaming devices.

2. Background Art

Slot machines and video poker machines continue to be the most widely used types of gaming devices found in the gaming industry. The oldest slot machines and video poker machines were relatively simple devices which included little in the way of sound generating devices, commonly including only a bell or buzzer to signify a winning combination on the reels. With the advent of new technology in the gaming industry, the slot machines and video poker machines were now able to produce a variety of pre-programmed sounds and video through the use of computer chip technology. These pre-programmed sounds and video are of significant importance to maintaining player interest in a particular gaming machine. Consequently, changes or updates to any of the game features including video, audio, bonusing systems or of the game itself are important. As a result, the ability to change electronic games as quickly and as easily as possible to meet evolving player tastes is necessary.

SUMMARY OF INVENTION

In some aspects, the invention relates to a gambling game, comprising: a gaming device with an outcome processor that determines gambling game outcomes; and a bonus system that generates a payout supplemental to the gambling game outcome, where the bonus system is responsive to events in the gaming device.

In other aspects, the invention relates to a gambling game, comprising: a gaming device with a game logic component that determines the gaming device outcome; and a bonus system that awards a bonus through the gaming device independent of the gaming device outcome, where the bonus system is responsive to events in the gaming device.

In other aspects, the invention relates to a gambling game, comprising: a slot machine; and a dispenser that distributes bonus materials, where the dispenser is activated by the slot machine.

In other aspects, the invention relates to a gambling game, comprising: a slot machine; and a printer that prints bonus materials, where the printer is activated by the slot machine.

Advantages of the present invention include a gaming device, comprising: a main processor unit containing a gaming logic circuit that generates event signals; a signal transmission device that detects the event signals; and a peripheral device processor unit that receives the event signals from the signal transmission device, where the peripheral device processing unit cannot influence the generation of the event signals.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
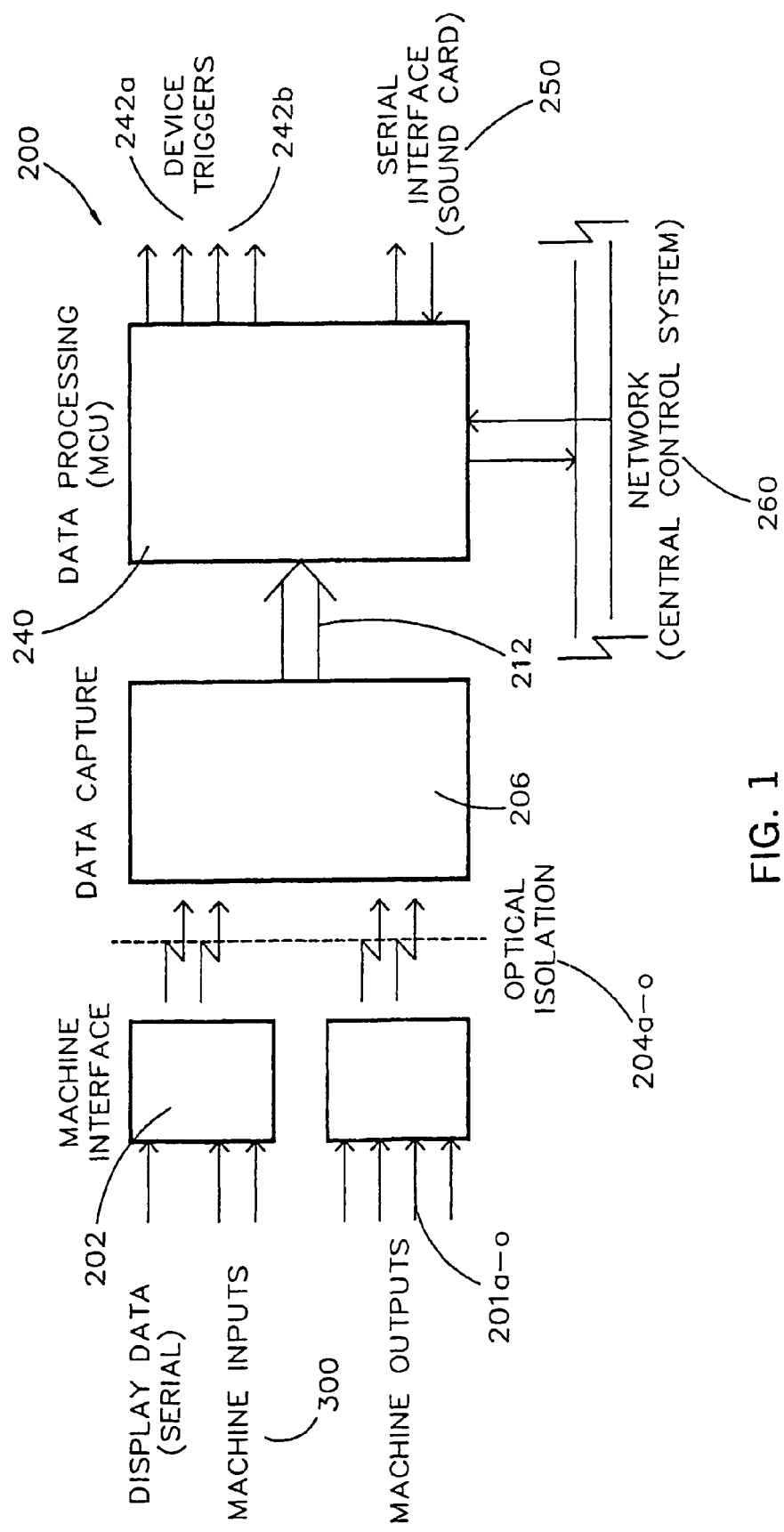
FIG. 1 is a high level block diagram of the present invention showing the elements thereof.
Figure 2A:
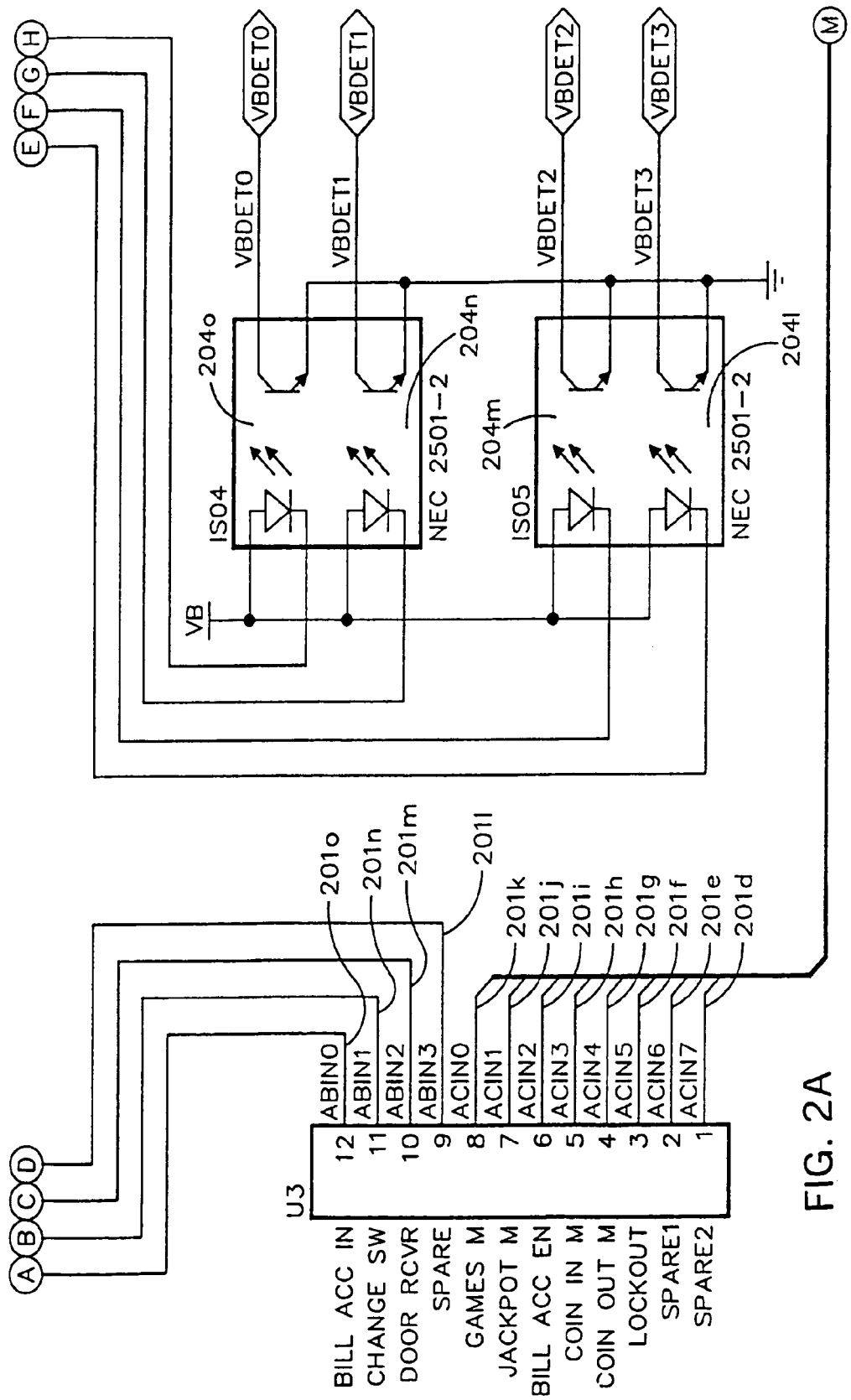
FIGS. 2A-2E are detailed circuit diagrams of the input section of the electronic activity detector and command generator.
Figure 2B:
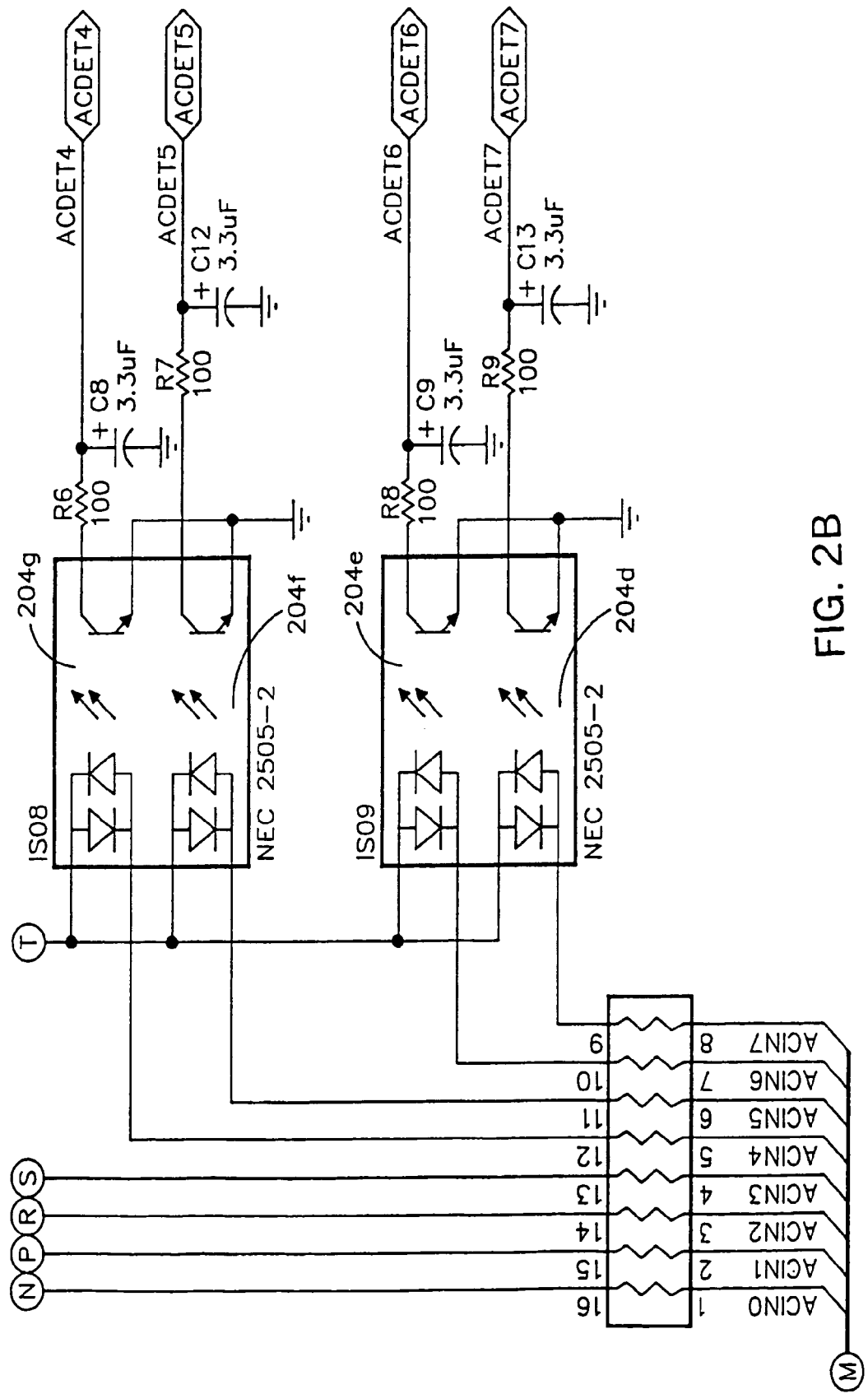
Figure 2C:
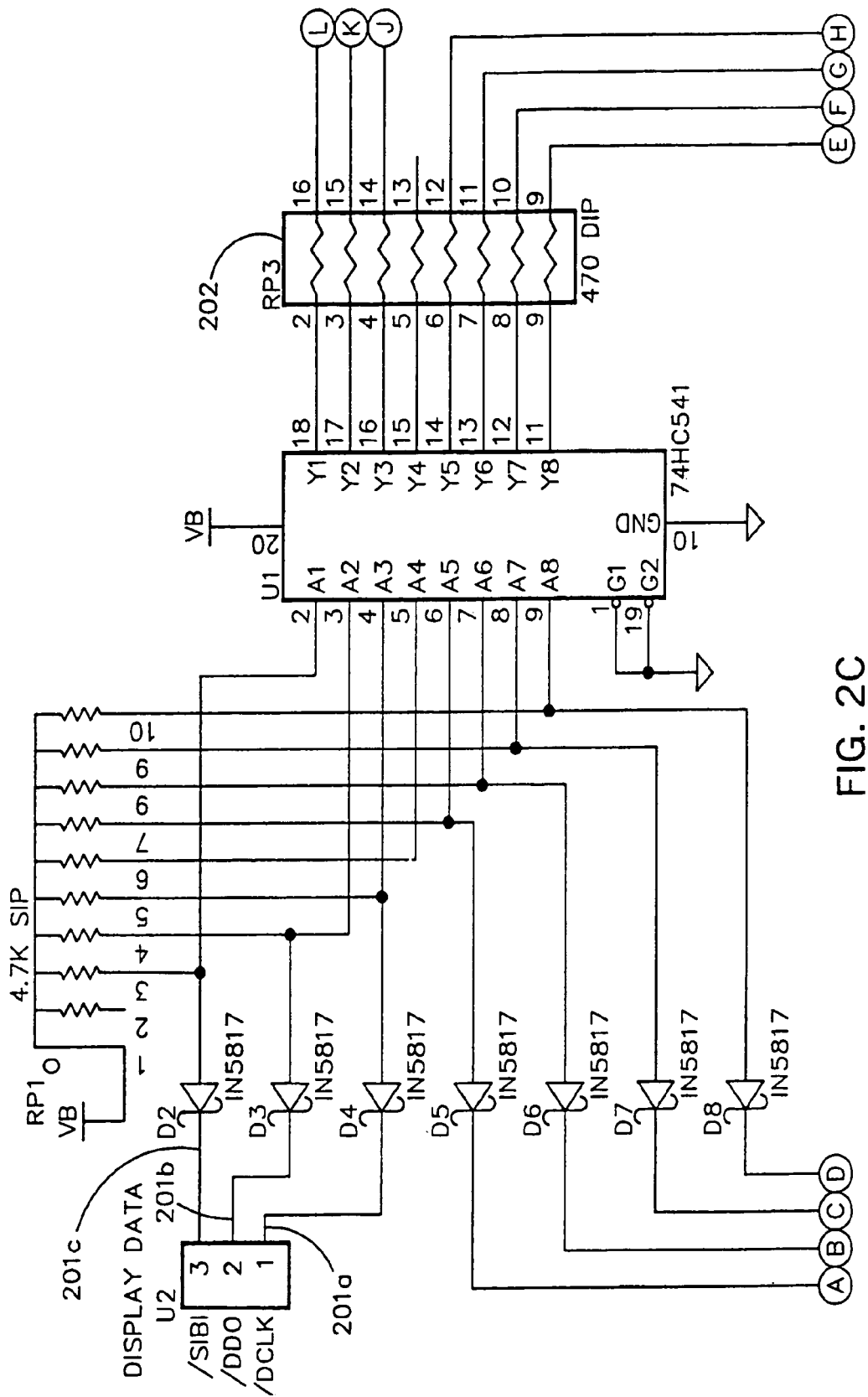
Figure 2D:
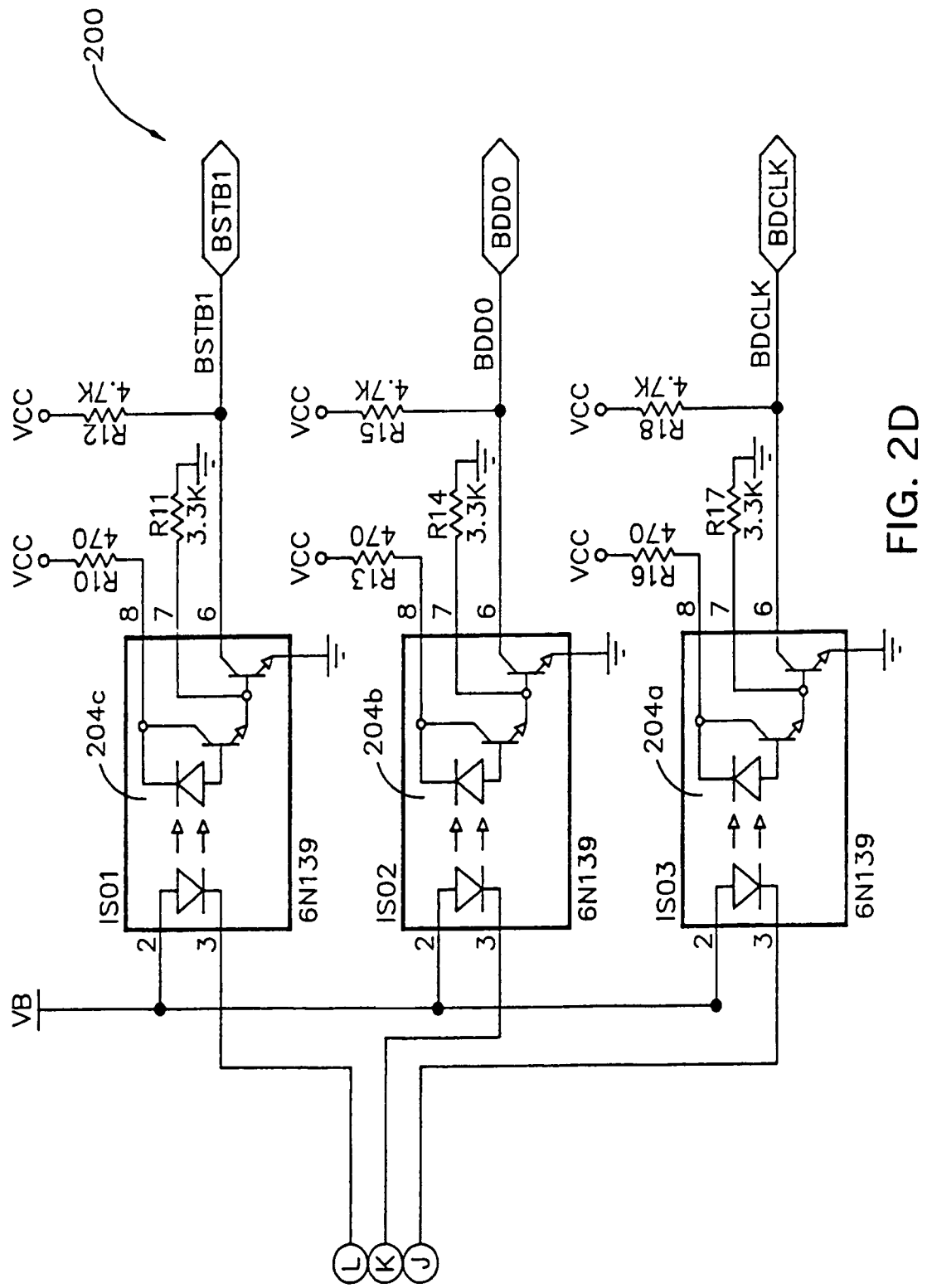
Figure 2E:
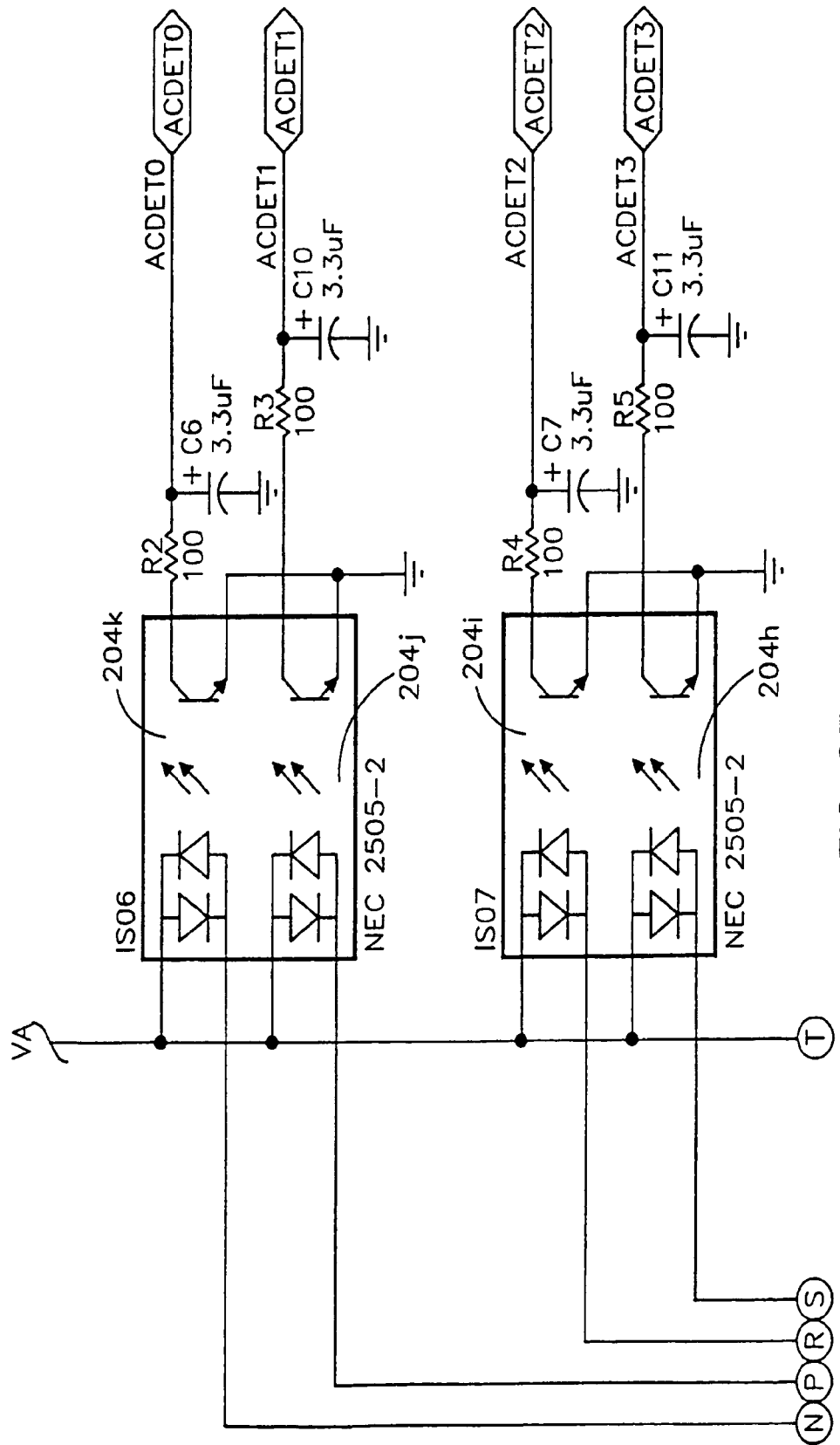
Figure 3A:
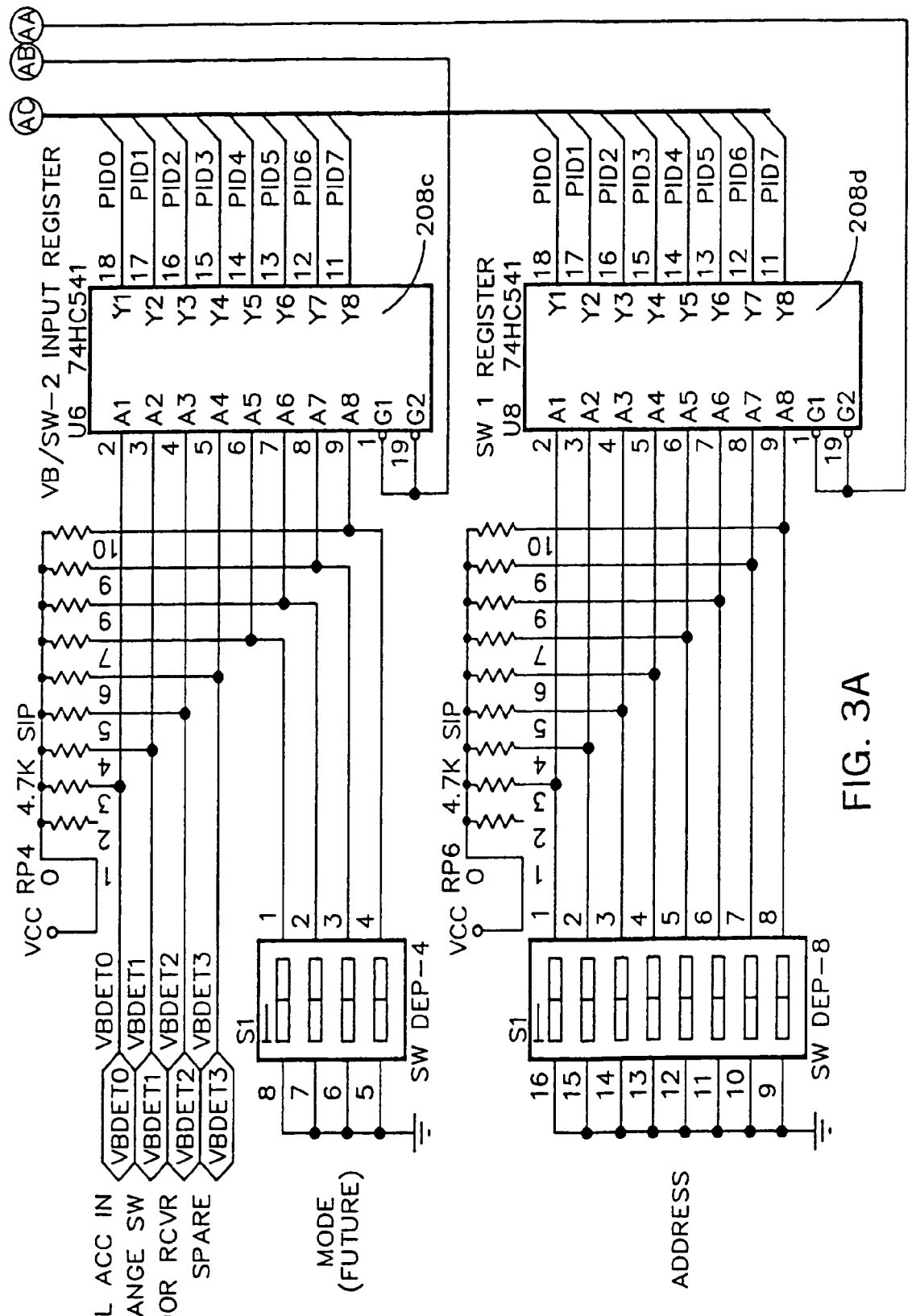
FIGS. 3A-3E are detailed circuit diagrams of the event occurrence information signal computing device or main computing unit showing the inputs and outputs thereof.
Figure 3B:
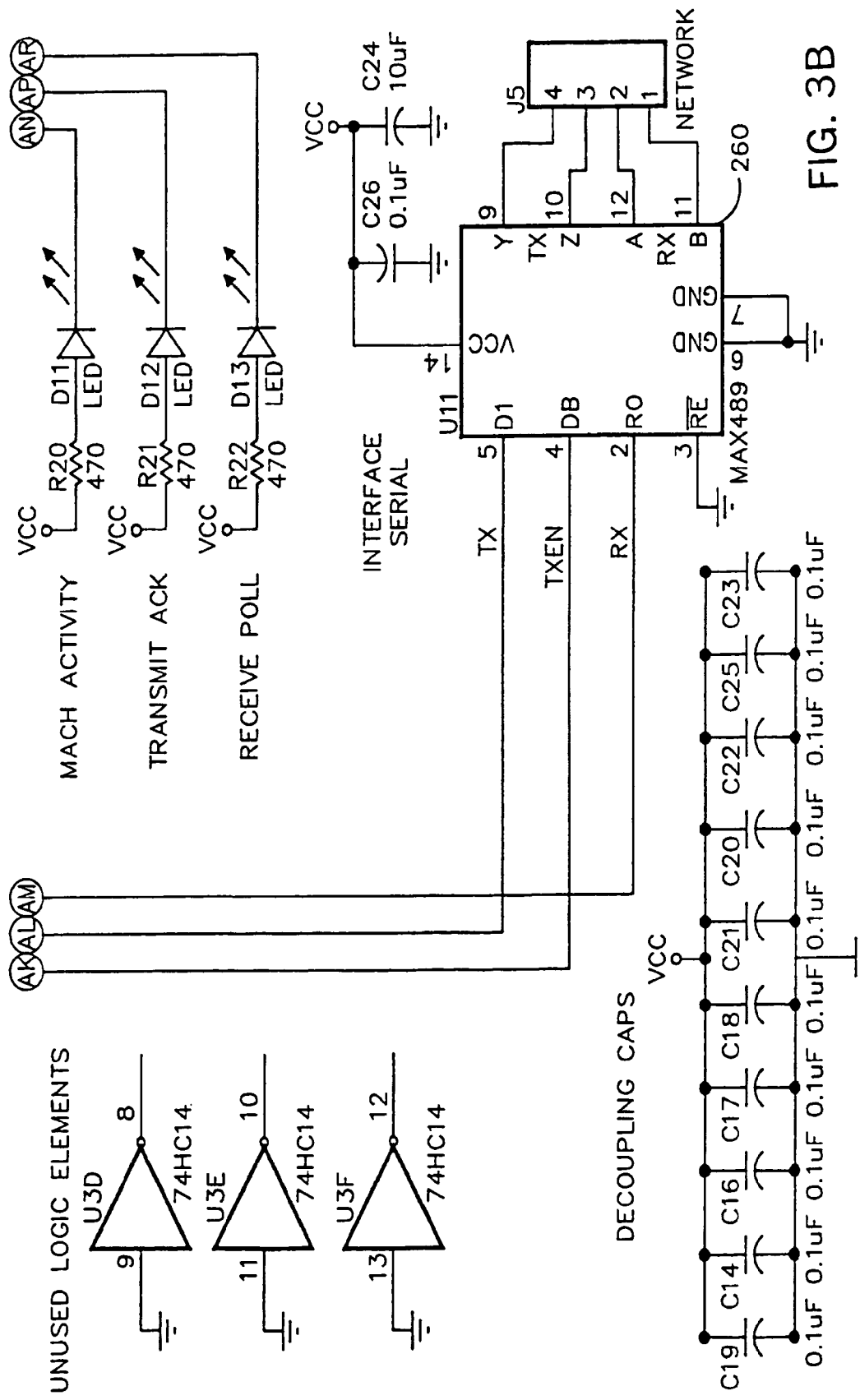
Figure 3C:
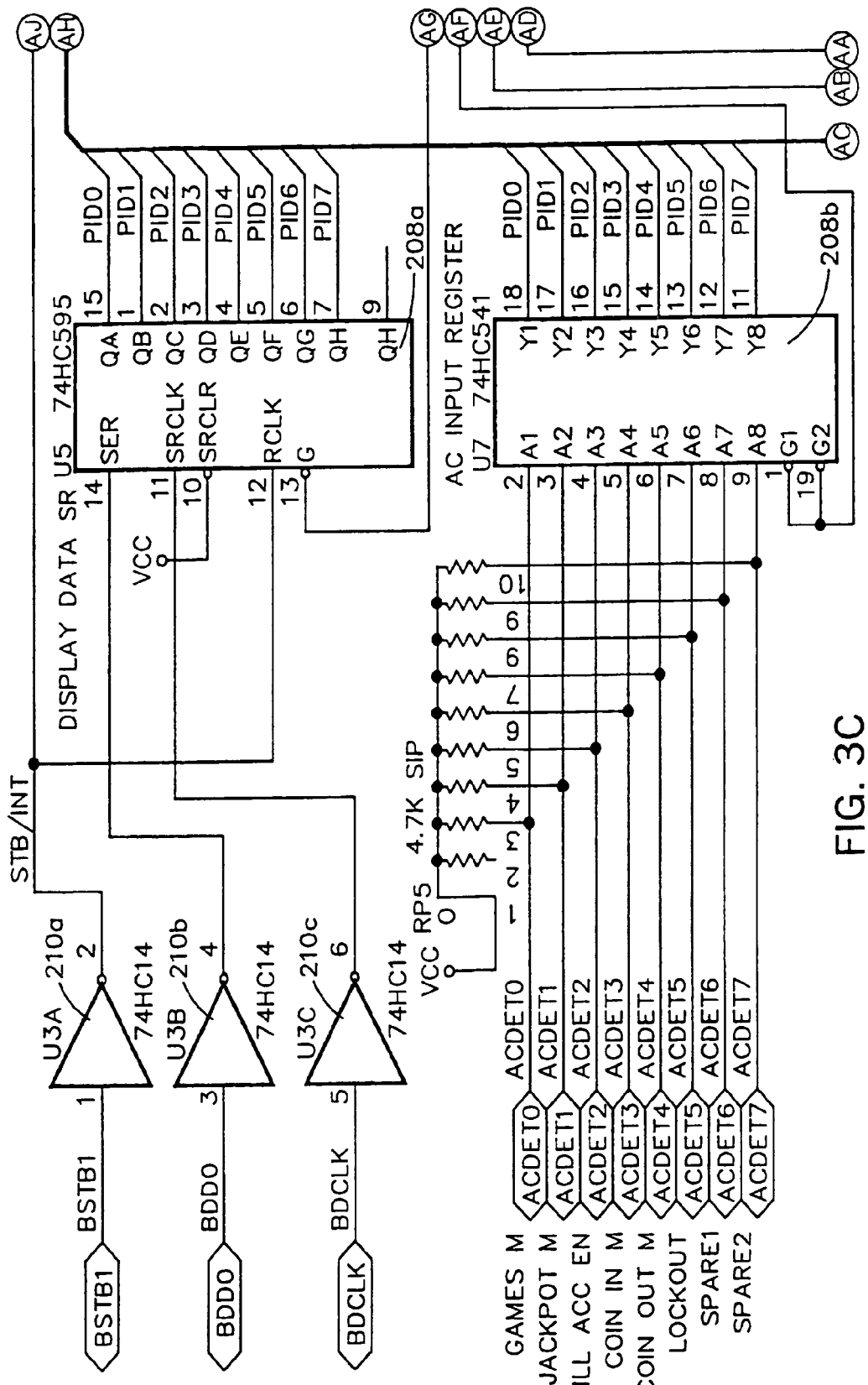
Figure 3D:
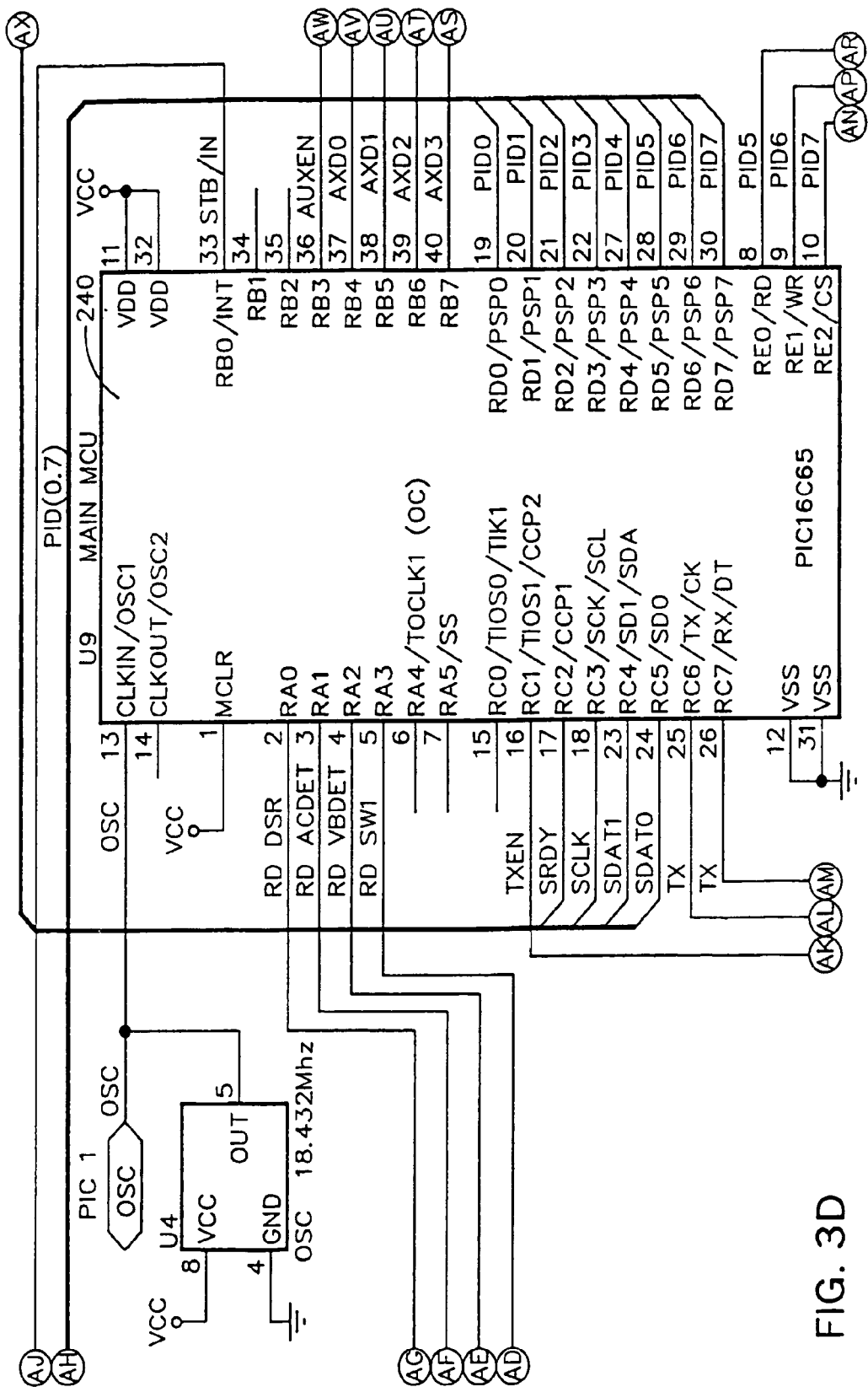
Figure 3E:
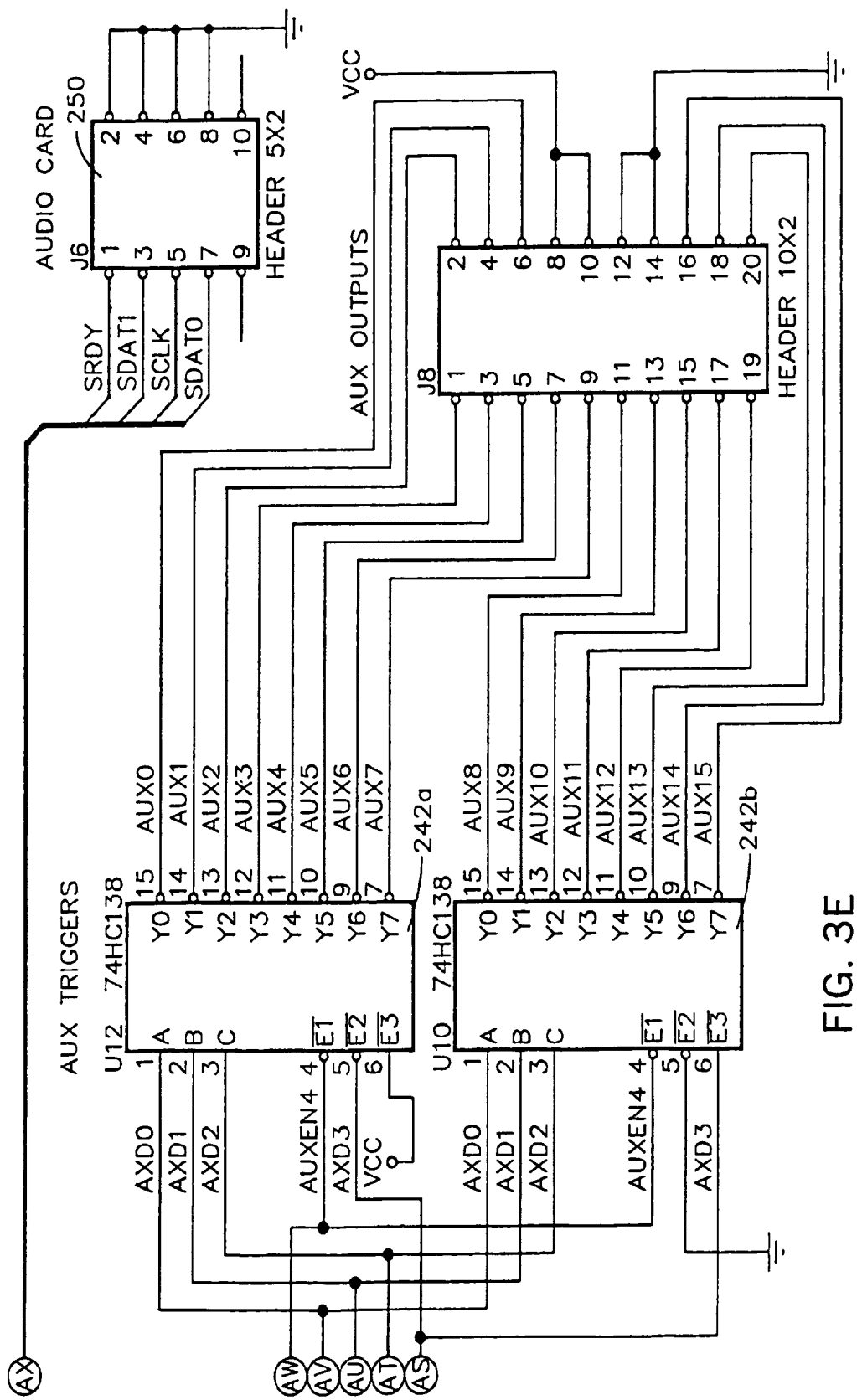

It has been found that there is substantial player interest in the development of a bonusing system for electronic gaming devices which outputs bonus items, the items either having intrinsic value or being representative of the bonus received and which are redeemable for the indicated bonus. Any such add-on electronic activity detector would have to be incapable of influencing the outcome probabilities as dictated by the gaming logic of the gaming device, and thus a unidirectional detection device for detecting specific event occurrences on the electronic circuit board would be preferred.

In a typical slot machine, there are numerous machine event occurrences which would need to be sampled in order to determine whether the particular event has occurred. These include such occurrences as a bill accepted into the machine, a jackpot being hit, coin in, coin out and other display data. Each of these machine inputs and outputs would need to be monitored to determine event occurrences, but must be monitored in such a way that the event occurrence cannot be tampered with in order to conform to applicable gaming regulations. Therefore, there is a need for an electronic activity detector and command generator which is capable of detecting event occurrences on the circuit board of a gaming device and then issue appropriate demands in response to those event occurrences which will cause connected output devices to perform designated tasks.

The electronic activity detecting portion of the card is that portion of the card that will identify that an event is taking place within the machine (i.e., coin in, jackpot. etc. . . . ), and the command portion of the card is that portion which recognizes the event and dictates the proper response. Although it is expected that one of the major output functions of any card performing these functions would be that of sound reproduction, there is also a need for other types of outputs, including printer functions, lights and gaming information. This device reads and reacts to gaming machine outputs, and, depending on the programming of the device, outputs the appropriate command signals to output devices to drive the output devices to perform their respective functions without affecting the regulated components of the gaming device.

It has also been found that increased game play can result from the dispensing or paying off of bonuses in connection with particular reel or display combinations on the electronic gaming device being hit. Such bonusing items could include plush toys, vouchers for meals, cash, lottery tickets, coupons, promotional materials, other prizes or almost any other type of prize award.

Embodiments of the present invention include the dispensing or printing of a bonus item from a secondary output device not directly associated with the standard payment device on the gaming device which is most commonly a coin or scrip dispenser. The bonus may be dispensed in connection with a predetermined event or series of events occurring on the gaming device, such as coin in or a particular combination being "hit" on the electronic gaming device. Such a bonusing system which would both increase game play and decrease the dissatisfaction of the consumer, as a reel combination that is not ordinarily a payout combination may result in the obtaining of bonus prizes.

Embodiments of the present invention provides a printing and dispensing bonusing system for electronic gaming devices, particularly a casino gaming device, which includes at least one detection device which is adapted for connection to an electronic apparatus, the detection device operative to detect selected event occurrences on an electronic apparatus and output event occurrence notification signals upon detection of an event. An event detection sampling device is connected in information transmission connection with the detection means, the event detection sampling device operative to detect and receive event occurrence notification signals from the detection devices, analyze the received event occurrence notification signals and output event occurrence information signals including information specifying event occurrences. Connected in information transmission connection with the event detection sampling device is an event occurrence information signal computing device which is operative to receive and analyze the event occurrence information signals output by the event detection sampling device and upon detection of selected event occurrence information signals, output command signals for initiating at least one connected output device to perform a selected operation corresponding to the outputted command signal. The output device is operative to accept command signals from the programmable event occurrence information signal computing device and output the appropriate response corresponding to the command signal.

The present invention also provides a printing and dispensing bonusing system for electronic gaming devices, particularly a casino gaming device, which includes at least one detection device which is adapted for connection to an electronic apparatus or which is integral with the device, the detection device operative to detect selected event occurrences on an electronic apparatus and output event occurrence notification signals upon detection of an event. An event detection sampling device is connected in information transmission connection with the detection device, the event detection sampling device operative to detect and receive event occurrence notification signals from the detection devices, analyze the received event occurrence notification signals and output event occurrence information signals including information specifying preselected event occurrences. Connected in information transmission connection with the event detection sampling device is an event occurrence information signal computing device which is operative to receive and analyze the event occurrence information signals output by the event detection sampling device and upon detection of those event occurrence information signals, output command signals for initiating operation of a bonus printing and dispensing device connected to the programmable event occurrence information signal computing device operative to dispense or print a bonus item or bonus information from a secondary output device not associated with the standard coin or scrip dispenser, the bonus being dispensed in connection with at least one predetermined combination being "hit" on the electronic gaming device.

The advantages of the present invention include the fact that the present invention may be added to any existing gaming device to produce alternative command outputs in response to event occurrences in the electronic apparatus, thereby engaging various output devices. Furthermore, because the present invention is reprogrammable in a quick and easy manner, a variety of response schemes may be instituted over the life span of a gaming device, thus insuring that consumer interest in the game remains relatively high. Also, because the present invention is designed to sample events off of the electronic apparatus and cannot be used to modify the probabilities of gaming occurrences, it is believed that the present invention will be acceptable for use with slot machines and the like without requiring any more than minimal additional inspection and certification by the gaming commissions of the various jurisdictions or their agents. Because the computing device on the programmable electronic activity detector and command generator may be programmed to interrupt the normal sound and display output of the gaming device and substitute an alternative sound or display, exciting new varieties of games may be introduced even though the new game is being played on the old piece of gaming machinery. Also, one of the most exciting features of the present invention is that unique messages such as advertisements for casino activities and the like or interactive gaming experiences can be included in the programmable electronic activity detector and command generator, and the variety of messages is almost unlimited.

The present invention also combines the excitement of the traditional slot machine with an entirely new element of gaming, the printing or dispensing of bonus information or items through a secondary output device which is unrelated to the standard payment device. With the present invention, not only are winning reel combinations paid, but the player also will have the opportunity to win bonus prizes based on the occurrence of preselected events or a series of events, such as reel combinations.

The following description discloses two embodiments of the present invention. The first embodiment is a programmable electronic activity detector and command generator illustrated in FIGS. 1-3E.

FIGS. 2A-2E and 3A-3E illustrate the programmable electronic activity detector and command generator 200 of the present invention. As shown in FIG. 1, the embodiment includes a machine interface 202 which consists of the connection of the programmable electronic activity detector and command generator 200 to the circuit board 300 of an electronic device. In this instance, as shown in FIGS. 2A-3E, the electronic device would be a typical slot machine having display data output, machine input information and machine output information which may be either sampled on the circuit board itself as will be necessary with many retrofit situations, or the slot machine may include a wiring harness which allows for simple connection to each of the data output locations from the circuit board. In either event, the machine interface 202 will access the information sites on the circuit board and allow for the event occurrence data to be transferred to the programmable electronic activity detector and command generator 200.

The machine interface 200 is connected, in the preferred embodiment, through a series of diodes and dip switches to the event detector devices 204a-o which operate to read the machine outputs. The event detector devices may be of various types of detectors, including optical isolators or the like, so long as the primary function of unobtrusively determining event occurrences is fulfilled. Each of the event detector devices 204a-o are connected to one of the machine output lines 201a-o and therefore when an event occurs on any of the machine output lines 201a-o, the event detector device 204a-o associated with that event will signify the occurrence of that event yet prevent any potential modification of the event status due to the one-way nature of the event detector devices. After the event detector device 204a-o activates in response to event occurrence on the machine board, the event occurrence notification signal corresponding to that event occurrence is transmitted to the data capture segment 206 of the embodiment 200. The data capture segment 206 consists of a plurality of input registers which receive the incoming event occurrence notification signal from the event detector devices 204a-o and interfaces the signal from the machine interface 202 to the event occurrence information signal computing device or main computing unit 240. The input registers 208b and 208c are each preferably connected to the machine inputs and machine outputs on the machine output line 201d-o whereas input register 208a is preferably connected to the display data coming from machine output lines 201a, 201b and 201c. The display data is in serial format coming from the circuit board 300 of the slot machine and thus must be changed over to parallel to permit the main computing unit 240 to access the incoming display data. For this reason, each of the incoming display unit lines is converted from serial to parallel format by an appropriate converter, shown as converter units 210a, 210b and 210c. The display data is then fed into input register 208a before being forwarded onto the main computing unit 240. Finally, input register 208d is designed for use with eight-bit addressing systems for future possible uses.

It should be clear that an additional operational feature of the data capture portion 206 of the embodiment 200 of FIGS. 1-3E is that the data capture portion 206 must be organized to permit the main computing unit 240 to sample the incoming data to determine event occurrences on the circuit board 300 of the slot machine. This would commonly be done by clock pulse synchronization or multiplexing in which the main computing unit 240 is programmed to periodically "poll" each of the input registers 208a-d to determine if an event has occurred. Each of the input registers 208a-d may be polled in turn to determine an event occurrence detected by the input registers 208a-d thus permitting the connection of all of the input register outputs to be placed on a signal bus line 212 leading to the main computing unit 240. The polling operation will be made more clear in the discussion regarding the main computing unit 240, but it should be generally understood that the input registers 208a-d operate in a manner generally understood by those skilled in the art.

The input registers 208a-d of the data capture portion 206 are connected in information transmission connection by bus 212 to the programmable event occurrence information signal computing device 240 which will, be referred to herein as the MCU (main computing unit). The MCU 240 is programmed to scan the input registers within the data capture portion 206 of the alternative embodiment and remove, identify and compare the event occurrence notification signals found within those registers to a decision table preloaded into the registers of the MCU 240 itself. This decision table may take any accepted form so long as the MCU 240 is able to access the data, identify particular event occurrence information signals and output command signals to connected output devices which command those output devices to perform certain functions based on particular machine events. For example, common machine events may include coin in, handle pull, jackpot, any other payoff combination or non-winning combination or the like.

The MCU 240 will preferably be an eight-bit CMOS microcontroller manufactured by Microchip Technology, Inc., part No. PIC16C6X. Of course, it is to be understood that numerous other types of microcontrollers may be used with the present invention provided those microcontrollers are programmable to perform the same or similar operations. Although the MCU 240 is shown as being wired into the system in one particular design in FIGS. 3A-3E, it should be further understood that the exact layout and connection of the hardware elements described herein is not overly critical to the present invention so long as the embodiment 200 is able to function as intended. Furthermore, although the MCU 240 of the present invention is programmed using RISC code, it is to be understood that the exact object code to be used in the MCU 240 is not critical to the invention so long as the MCU 240 operates to perform all of its intended functions.

When the MCU 240 identifies that an event occurrence information signal received from one of the input registers 208a-d corresponds to a table event within the register of the MCU 240, the MCU 240, due to its programming, determines that a command signal should be sent to a connected output device. As best seen in FIGS. 6, the MCU 240 is programmed and hardwired to output command signals in two basic formats, one being a simple command pulse or device trigger for the triggering of an output device such as a bell, whistle, or light, and the second being a serial interface for connection to more sophisticated output devices such as a sound card or a printer. The programmable electronic activity detector and command generator 200 of the present invention is designed to substitute alternative output device responses for particular event occurrences in the slot machine. Obviously, modification and/or replacement of all of the event occurrences produced by the machine is not necessary nor even advisable in many instances and therefore the MCU 240 is operative to replace or supplement only those events designated for replacement by the event table in the MCU and allow the remaining machine outputs to be produced normally by the slot machine.

When the MCU 240 detects that a designated event has occurred in the slot machine by a match of a selected event occurrence information signal and an event held within the table, the MCU 240 generates a command signal which is sent to connected output devices. Depending on the event occurrence in the slot machine, the command signal which is output by the MCU 240 will be a command pulse, which will be sent via the auxiliary triggers 242a and 242b which send a simple trigger pulse to connected output devices designed for activation by such command pulses, or will be a serial format command signal for commanding serial output devices such as an audio card, a printer or other such serial output device. The information transmission connection of the MCU 240 to the serial output devices would preferably consist of a serial peripheral interface 244 of an industry standard format. Finally, the serial command signals output by the MCU 240 would preferably be in standard serial format to permit the use of many different types of output devices with the programmable electronic activity detector and command generator 200, connection to which would be by a standard serial cable. Of course, as a virtually limitless number of types of output devices may be used with the presently described device, the command signals output by the MCU 240 may be modified to conform to the particular connected output device, as would be understood by one skilled in the art.

The command signals sent by the MCU 240 would preferably be in the format commonly used for command of printers, sound cards and the like to facilitate the use of the present invention with already existing hardware, and the programming and operation of such devices is well-known in the prior art. One important aspect of the present invention is that allowance has been made for the MCU 240 to include a network interface 260 which can be used to connect the programmable electronic activity detector and command generator 200 to a central control system (not shown). Through the network interface 260, the central control system will be able to collect event information from the slot machine and also will be able to download command information to the programmable electronic activity detector and command generator 200 to activate connected output devices. A prime example of the use of this connection would be to immediately reward a game player upon hitting a certain combination on the reels, which was being monitored over the central control system. It is expected that the network system would be implemented as was previously discussed, although any appropriate network system could be used for the present invention.

One other possible use of the present invention is as a tie-in with state-run lotteries in which the network capabilities of the present invention would be used to provide a wide-area "Powerball" type jackpot payoff on one particular combination being achieved. The specific nature of this implementation will be made apparent in future documentation, but this and other such examples serve to illustrate the virtually limitless possibilities for use of the present invention.

The second embodiment of the present invention is similar in function to the first embodiment, but incorporates additional features which further emphasize the unique aspects of the present invention. The bonus printing and dispensing method of the present invention includes the features of the previous embodiment but provides a bonus printing and dispensing device operatively connected to the MCU 240 and the command signals sent by the MCU 240 correspond to the occurrence of preselected event or series of events occurring on the electronic gaming device. The detection of a preselected event or series of events is performed by the event detector devices 204a-o which signal the occurrence of the event by the transmission of an event occurrence notification signal corresponding to that event occurrence to the data capture segment 206 of the embodiment 200. The event detector devices 204a-o may be of various types as described previously, and may even be constructed as integral elements of the gaming device, so long as they function to detect event occurrences in the gaming device. The MCU 240 is programmed to recognize those preselected event occurrences, the programming being done by standard programming methods understood to those skilled in the art, and issue command signals to the connected bonusing system of the present invention, which, in the preferred embodiment, may include a bonus information printing device, bonus item dispensing device and/or a connected electronic gaming device to output a bonus item or bonus information. It is important to note that the bonus printing or dispensing device is separate from the standard payout device of the electronic gaming device and is controlled separately by the MCU 240. This means that the bonus payout is independent of the regular payout and can be modified without affecting the payout of the gaming device. This allows the casino or operator to modify the bonus payouts according to its wishes, without requiring additional inspection by a gaming commission or its agent.

A preferred embodiment of the bonusing system of the present invention would include a printing device operative to print bonus prize information which would be redeemable for a selected bonus prize. When a preselected event or series of events occurs on the gaming device, the printing device is commanded by the MCU 240 to dispense a printed ticket or voucher which can be redeemed for the selected bonus item or prize. Alternatively, the system would include a dispensing device which could be a vending device or the like which operative to output bonus items including coin, cash, bonus tickets, lottery tickets, scratch off tickets, complimentaries, promotional materials, and other such bonus awards.

Of course, the key and critical element of the above invention is that bonus payout is printed or dispensed by a separate device independent of the standard payout device of the gaming device and is tied to the occurrence of selected reel or outcome combinations on the electronic gaming device, and other occurrences on the gaming device do not directly influence the bonus payout. The above-described invention is believed to provide a substantial improvement over the prior art, as the player of the gaming device will not only win standard payouts but will also win bonus prizes based on selected events or series of events occurring. Moreover, as the present invention provides a legitimate bonus versus a split payment of a predetermined amount, the player is more likely to continue playing the gaming device regardless of outcome, as they will still be receiving bonus prizes. Finally, as the present invention provides bonuses not connected with the payment calculations of the machine, the player may receive bonuses despite not hitting a standard payout combination.

It is to be understood that numerous additions, modifications, and substitutions may be made to the programmable electronic activity detector and command generator 200 and printing and dispensing bonusing system of the present invention which fall within the intended broad scope of the appended claims. For example, the microprocessors may potentially be combined into a single microprocessor chip programmed to perform the functions of each of the three chips. Furthermore, the specific object code used to program the microprocessors may be modified or changed in many ways so long as the function of each of the elements of the programmable electronic activity detector and command generator 200 and printing and dispensing bonusing system are able to function in the correct and efficient manner. Also, the detection devices of the present invention, described herein as optical interfaces, may be modified, changed or replaced entirely with detection devices which fulfill the intended function of identification of event occurrences and transfer of that information to the programmable electronic activity detector and command generator 200. Possibilities include optical readers which read the reel combinations produced by the machine and electromagnetic pulse detectors for detection of event occurrence signals, in addition to detectors directly connected to the gaming device or formed integrally therewith. Also, the exact designs and structures of the programmable electronic activity detector and command generator 200 and printing and dispensing bonusing system may be rearranged or modified as necessary to fit within the gaming device environment. Finally, the printing and dispensing bonusing system of the present invention may be modified or changed to issue different types of bonuses in connection with different series of occurrences on the gaming device, in addition to various types of printing and dispensing devices.

There have thus been shown and described a programmable electronic activity detector and command generator 200 and a printing and dispensing bonusing system which accomplish at least all of their stated objectives.

It is to be understood that the MCU 240 can command all peripheral devices it shares with an electronic gaming device (EGD), peripheral devices for which it is the sole command device, peripheral devices it shares with other equipment and/or systems, etc. An example of commanding EGD peripherals is when the MCU 240, upon occurrence of an event, or series of events, commands the EGD video display system and audio system to output bonus related animation, and corresponding audio for a player. The player would then engage player controls, if necessary, and make selections. Thereafter, the MCU 240 would command the EGD's video and audio systems to present the bonus outcome with corresponding video and audio outputs such as an animated lottery drawing, etc. The bonus outcome itself can be pre-selected and stored in memory or it can be generated by programming in the MCU 240 itself or generated by a connected peripheral device programmed, or otherwise able, to generate and/or deliver a bonus outcome to the MCU 240 (e.g. a random number generator (RNG), an EGD RNG, pre-selected table, drawing, etc. Thereafter, the MCU 240 may command a printer, cashless system, player tracking system, dispensing device, payment device, data based award delivery device or other device, to generate and/or deliver an award to the player, if the previously generated/pre-selected bonus outcome entitled the player to such award.

Throughout this process the EGD's non-bonusing activities and/or outputs will be interrupted, or reordered, to allow the bonusing routines to finish prior to resuming normal activities and/or inputs and/or outputs. This may occur by pausing the circuit board's normal programming routines, interrupting the circuit board's communications with the EGD's various component parts and delaying their command execution or it can similarly be accomplished by simply adding the bonusing routine elements to the EGD processing queue in the appropriate order and allowing the EGD processor, or the MCU 240, to execute the bonusing routines independent of the game outcome processing using common programming and/or circuitry tools and/or configurations including logic gates, application programming interfaces (APIs), HKEYs, hashing, etc. to maintain a level of separation between an EGD's critical functions and other functions such as bonusing, peripheral device functions, etc.

In one example, the video files, audio files, bonus outcome generation programming files, etc. are stored in memory separate from that of the EGD's game logic circuitry and/or processor programming. The memory storage device may be proximate to the MCU 240 or it may be available via the network connection 260. Such configurations separate creative content from the EGD's game logic circuitry and/or processor and are employed so that the creative content and/or its programming can be modified and/or updated, either directly or via the network connection 260, without impacting, or otherwise affecting, the more sensitive game logic circuitry and/or processor and/or programming contained therein.

It is to be understood that all creative content and/or peripheral programming for an EGD can be handled in a similar fashion, that is, separated from the EGD's critical components and/or programming. This arrangement need not be limited to creative content and peripheral programming, etc. used with bonusing. It would also be beneficial to maintain such a separation to more easily and efficiently modify all levels of creative content and/or peripheral programming with or without modifying the game outcome programming, etc.

It should also be understood that it is the function of the programmable activity detector and command generator 200 (AMU) and/or the MCU 240 that is/are relevant to the present invention and not its/their precise construction, location, etc. In fact, so long as the AMU 200 and/or the MCU 240 function(s) as described, including not interfering with the EGD's game outcome determination, the function(s) of the AMU 200 and/or the MCU 240 may be carried out by any device or software construct within an EGD or EGD system with or without unidirectional information transfer.

Using a separate device like an AMU 200 offers numerous benefits. One of these benefits is the ability to use the AMU 200 as a universal controller for all of the peripheral devices employed by an EGD. As mentioned, this separation of the critical outcome determination logic from most, if not all, of the remaining functions of the gambling device makes for easier updating of non-critical functions and can expedite regulatory review processes.

Embodiments of the present invention include use in gaming devices and gambling games such as: a slot machine; video poker; keno; video 21 or "Blackjack"; a video lottery terminal (VLT); a video lottery system; a game that is controlled by a central determinant system; any other video game; a playing card game; a card shuffler; or a table game.

Other embodiments of the present invention include a bonusing system that generates a bonus without regard to the outcome of the gambling device but that is responsive to events that occur within the gambling device. The bonus system could be integrated into the gambling device or a detachable module that could be included as an "add on" modification to an existing game.

Notification of an award or bonus could occur via video, audio or other peripherals of the gambling device. A video notification of an award could manifest itself as any simulated, or actual, outcome, for example, a lottery drawing graphically displayed on the EGD monitor or another display. The bonus could be awarded as pre-printed materials such as a coupon, "scratch-off" ticket, etc. The pre-printed materials are typically awarded by a dispensing device. Tangible prizes can also be delivered by a dispensing device. Alternatively, the bonus could be awarded by a printer that prints bonus materials such as a lottery entry, lottery award, credits redeemable by an EGD, etc.

The bonus system may be part of a network of bonus systems. Such a network may be controlled by a central control device. This type of bonus system may be part of a "wide area progressive" type system that may span multiple machines, multiple casinos, or multiple jurisdictions, etc. The central control device may determine all aspects of the bonusing system such as determination of a bonusing event, notification of a bonus award, and instructions for awarding the bonus.

It is an object of the present invention to provide a printing and dispensing bonusing system for electronic gaming devices which includes at least one detection device adapted for connection to an electronic apparatus, or which is integral with the device, which is operative to detect selected event occurrences on the electronic apparatus and output event occurrence notification signals upon detection of an event.

Another object of the present invention is to provide a printing and dispensing bonusing system for electronic gaming devices which includes an event detection sampling device in information transmission connection with the detection devices, the event detection sampling device operative to receive and detect the event occurrence notification signals from the detection devices, analyze the signals and output event occurrence information signals specifying the occurrence of a preselected event or events on the electronic apparatus circuit board.

Another object of the present invention is to provide a printing and dispensing bonusing system for electronic gaming devices which includes a programmable event occurrence information signal computing device in information transmission connection with the event detection sampling device, the computing device operative to receive and analyze event occurrence information signals output by the event detection sampling device and upon detection of event occurrence information signals, output command signals for initiating operation of a printing and/or dispensing device and/or a cashless system connected to the programmable event occurrence information signal computing device, the printing and/or dispensing device operative to dispense and/or print a bonus item or information, the bonus being dispensed in connection with at least one event occurring on the electronic gaming device.

Another object of the present invention is to provide a printing and dispensing bonusing system for electronic gaming devices which may be quickly and easily reprogrammed to produce different outputs in response to electronic gaming device events.

Another object of the present invention is to provide a printing and dispensing bonusing system for electronic gaming devices, particularly a casino gaming device, which is capable of sampling event occurrences on the circuit board of the gaming device that is clearly incapable of influencing the outcome of any gaming event in the gaming device, thus permitting the electronic activity detector and command generator to be included in or added to gaming machines thereafter simplifying modifications for peripheral device programming, and requiring only minimal inspection by a gaming commission or its agent.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A gambling game, comprising:
   a gaming device with an outcome processor that determines gambling game outcomes; and
   a bonus system that generates a payout supplemental to the gambling game outcome, where the bonus system is responsive to events in the gaming device that are monitored through an interface that isolates external equipment communications, external data communications and external software communications from internal components, software and data of the gaming device.

2. The gambling game of claim 1, further comprising:
   an event detection device that detects events in the gambling device and activates the bonus system.

3. The gambling game of claim 2, where the event detection device instructs the bonus system to determine a bonus award.

4. The gambling game of claim 2, where the event detection device instructs the bonus system to deliver a bonus award.

5. The gambling game of claim 3, where the bonus system determines a bonus award.

6. The gambling game of claim 1, where the gaming device is a slot machine.

7. The gambling game of claim 1, where the gaming device is a video poker machine.

8. The gambling game of claim 1, where the gaming device is a keno machine.

9. The gambling game of claim 1, where the gaming device is a video lottery terminal.

10. The gambling game of claim 1, where the gaming device is a video lottery system.

11. The gambling game of claim 1, where the gaming device is a central determinant system.

12. The gambling game of claim 1, where the gaming device is a video game.

13. The gambling game of claim 1, where the gaming device is a video 21 game.

14. A gambling game, comprising:
    a gaming device with a game logic component that determines the gaming device outcome; and
    a bonus system that awards a bonus through the gaming device independent of the gaming device outcome, where the bonus system is responsive to events in the gaming device that are monitored through an interface that isolates external equipment communications, external command information communications and external bonus generation software communications from the game logic component of the gaming device.

15. The gambling game of claim 14, further comprising:
    a central control system that is connected to the gambling game, where the bonus system is responsive to the central control device.

16. The gambling game of claim 14, further comprising:
    a network of bonus systems that are connected to the central control system, where the network of bonus systems is responsive to the central control device.

17. The gambling game of claim 15, where the central control system instructs the bonus system to award a bonus.

18. A gaming device, comprising:
    a main processor unit containing a gaming logic circuit that generates event signals;
    a signal transmission device that detects the event signals; and
    a peripheral device processor unit that receives the event signals from the signal transmission device through an interface that isolates external equipment communications, external bonus information communications and external bonus generation software programs communications from internal components, software and data of the gaming logic circuit so that the external equipment, command information and software programs cannot influence the generation of the event signals.

19. The gaming device of claim 18, where the main processor unit is mounted on a separate circuit board from the peripheral device processor.

20. The gaming device of claim 18, where the main processor unit comprises a payout processor.

21. The gaming device of claim 20, where the payout processor determines a payout based on a predetermined payment calculation.

22. The gaming device of claim 21, where the predetermined payment calculation is generated by a paytable.

23. The gaming device of claim 20, where the payout processor is a standard payment mechanism.

24. The gaming device of claim 18, where the signal transmission device and the peripheral device processor unit are located within the main processor unit.

25. The gaming device of claim 18, where the signal transmission device comprises:
    a machine interface that receives event signals from the gaming logic circuit; and
    an event signal capture register that receives the event signals from the machine interface and transmits the event signals to the peripheral device processor.

26. The gaming device of claim 25, where the event signal capture register is optically isolated from the machine interface.

27. The gaming device of claim 25, where the event signal capture register is electro-magnetically isolated from the machine interface.

28. The gaming device of claim 18, where the peripheral device processor unit controls an output device.

29. The gaming device of claim 28, where the output device is a primary output device of gaming device.

30. The gaming device of claim 28, where the output device is a secondary output device of gaming device.

31. The gaming device of claim 18, where the peripheral device processor unit is connected to a network of gaming devices.

32. The gaming device of claim 31, where the network of gaming devices is operated by a central control system.

33. The gaming device of claim 31, where the network of gaming devices generates combined payouts from a plurality of gaming devices.

\* \* \* \* \*